(12) United States Patent
Müller

(10) Patent No.: US 11,356,641 B2
(45) Date of Patent: Jun. 7, 2022

(54) EXTERNAL DEPICTION OF PHOTOGRAPHS OF A VEHICLE IN INTERIOR IN VR GOGGLES

(71) Applicant: AUDI AG, Ingolstadt (DE)

(72) Inventor: Tobias Müller, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/616,141

(22) PCT Filed: May 18, 2018

(86) PCT No.: PCT/EP2018/063070
§ 371 (c)(1),
(2) Date: Nov. 22, 2019

(87) PCT Pub. No.: WO2018/215332
PCT Pub. Date: Nov. 29, 2018

(65) Prior Publication Data
US 2020/0151472 A1   May 14, 2020

(30) Foreign Application Priority Data

May 24, 2017  (DE) .......................... 102017208806.0

(51) Int. Cl.
*H04N 7/18*  (2006.01)
*G06T 7/73*  (2017.01)
(Continued)

(52) U.S. Cl.
CPC ............. *H04N 7/183* (2013.01); *G06F 3/011* (2013.01); *G06T 3/0018* (2013.01); *G06T 7/74* (2017.01);
(Continued)

(58) Field of Classification Search
CPC .......... G02B 27/017; G02B 2027/0138; G02B 2027/014; B60K 2370/55; B60K 35/00;
(Continued)

(56) References Cited

U.S. PATENT DOCUMENTS

2004/0057600 A1*  3/2004  Niwa .................. G06T 7/215
                                                382/103
2004/0257208 A1* 12/2004  Huang ................... B60R 25/33
                                                340/426.1
(Continued)

FOREIGN PATENT DOCUMENTS

CN     105151001 A    12/2015
DE     19634184 A1     2/1998
(Continued)

OTHER PUBLICATIONS

Trivedi et al. ("Looking-in and looking-out of a vehicle: Computer-vision-based enhanced vehicle safety." IEEE Transactions on Intelligent Transportation Systems 8.1 (2007): 108-120 (Year: 2007).*
(Continued)

*Primary Examiner* — Pinalben Patel
(74) *Attorney, Agent, or Firm* — Staas & Halsey LLP

(57) ABSTRACT

At least one image of an interior of a vehicle is captured by at least one camera present in the vehicle. Image data of the at least one image that are denoted in reference to the vehicle are transmitted to an external server. A user is authorized by the external server to access the image data denoted in reference to the vehicle, for display to the user via VR goggles. An object detected by numerical methods is highlighted in color in the image depicted in the VR goggles.

20 Claims, 1 Drawing Sheet

(51) Int. Cl.
| | |
|---|---|
| *G06F 3/01* | (2006.01) |
| *G06T 3/00* | (2006.01) |
| *G06T 19/00* | (2011.01) |
| *G06V 20/20* | (2022.01) |
| *G06V 20/59* | (2022.01) |

(52) U.S. Cl.
CPC ............ *G06T 19/006* (2013.01); *G06V 20/20* (2022.01); *G06V 20/59* (2022.01); *B60K 2370/177* (2019.05); *B60K 2370/55* (2019.05); *B60K 2370/592* (2019.05)

(58) Field of Classification Search
CPC ........ B60K 2370/797; B60K 2370/177; B60K 2370/589; B60K 2370/592; B60K 2370/21; B60K 37/06; H04N 7/183; H04N 5/2252; B60R 25/305; G06T 19/006; G06T 3/0018; G06T 7/74; G06F 3/011; G06K 9/00671; G06K 9/00832
See application file for complete search history.

(56) References Cited

U.S. PATENT DOCUMENTS

| | | | | |
|---|---|---|---|---|
| 2006/0251293 | A1* | 11/2006 | Piirainen | B60R 21/01516 |
| | | | | 382/104 |
| 2007/0086624 | A1* | 4/2007 | Breed | G06K 9/00832 |
| | | | | 382/104 |
| 2010/0182425 | A1* | 7/2010 | Sakaki | B60N 2/002 |
| | | | | 348/135 |
| 2013/0138714 | A1* | 5/2013 | Ricci | G07C 5/006 |
| | | | | 709/201 |
| 2013/0154298 | A1* | 6/2013 | Ricci | B60K 35/00 |
| | | | | 296/37.12 |
| 2013/0200991 | A1* | 8/2013 | Ricci | B60K 37/06 |
| | | | | 340/4.3 |
| 2015/0137985 | A1* | 5/2015 | Zafiroglu | G06K 7/10297 |
| | | | | 340/686.1 |
| 2015/0206329 | A1* | 7/2015 | Devries | G06F 16/583 |
| | | | | 345/633 |
| 2017/0330034 | A1* | 11/2017 | Wang | H04L 67/306 |
| 2018/0056940 | A1* | 3/2018 | Etonye | B60R 25/104 |
| 2019/0187479 | A1* | 6/2019 | Nishizawa | G06F 1/163 |
| 2019/0253670 | A1* | 8/2019 | Chien | F21S 4/28 |
| 2019/0279008 | A1* | 9/2019 | Abhau | G06T 15/04 |

FOREIGN PATENT DOCUMENTS

| | | | |
|---|---|---|---|
| DE | 29819117 U1 | 3/2000 | |
| DE | 102010010179 A1 | 9/2011 | |
| DE | 102013016245 A1 | 6/2014 | |
| DE | 102013019563 A1 | 5/2015 | |
| DE | 102014013961 A1 | 3/2016 | |
| DE | 102015003884 A1 | 9/2016 | |
| DE | 102015004749 A1 | 10/2016 | |
| DE | 102015011815 A1 | 3/2017 | |
| DE | 102016120116 A1 * | 4/2018 | .......... H04N 21/816 |
| JP | 2009-75756 | 4/2009 | |
| WO | 2014/072972 A1 | 5/2014 | |

OTHER PUBLICATIONS

English Translation by WIPO dated Nov. 28, 2019 of the International Preliminary Report on Patentability in corresponding International Patent Application No. PCT/EP2018/063070.
International Search Report for PCT/EP2018/063070 dated Sep. 6, 2018.
German Office Action for German Application No. 10 2017 208 806.0 dated Dec. 20, 2017.
"Head-Mounted Display", Wikipedia; printed from de.wikipedia.org/w/index.php?title-Head-Mounted_Display&oldid=164028088; 6 pp.
PCT/EP2018/063070, dated May 18, 2018, Tobias Müller, AUDI AG.
DE102017208806.0, dated May 24, 2017, Tobias Müller, AUDI AG.
Chinese Office Action dated Jul. 7, 2020 from Chinese Application No. 201880034032.X, 9 pages.

* cited by examiner

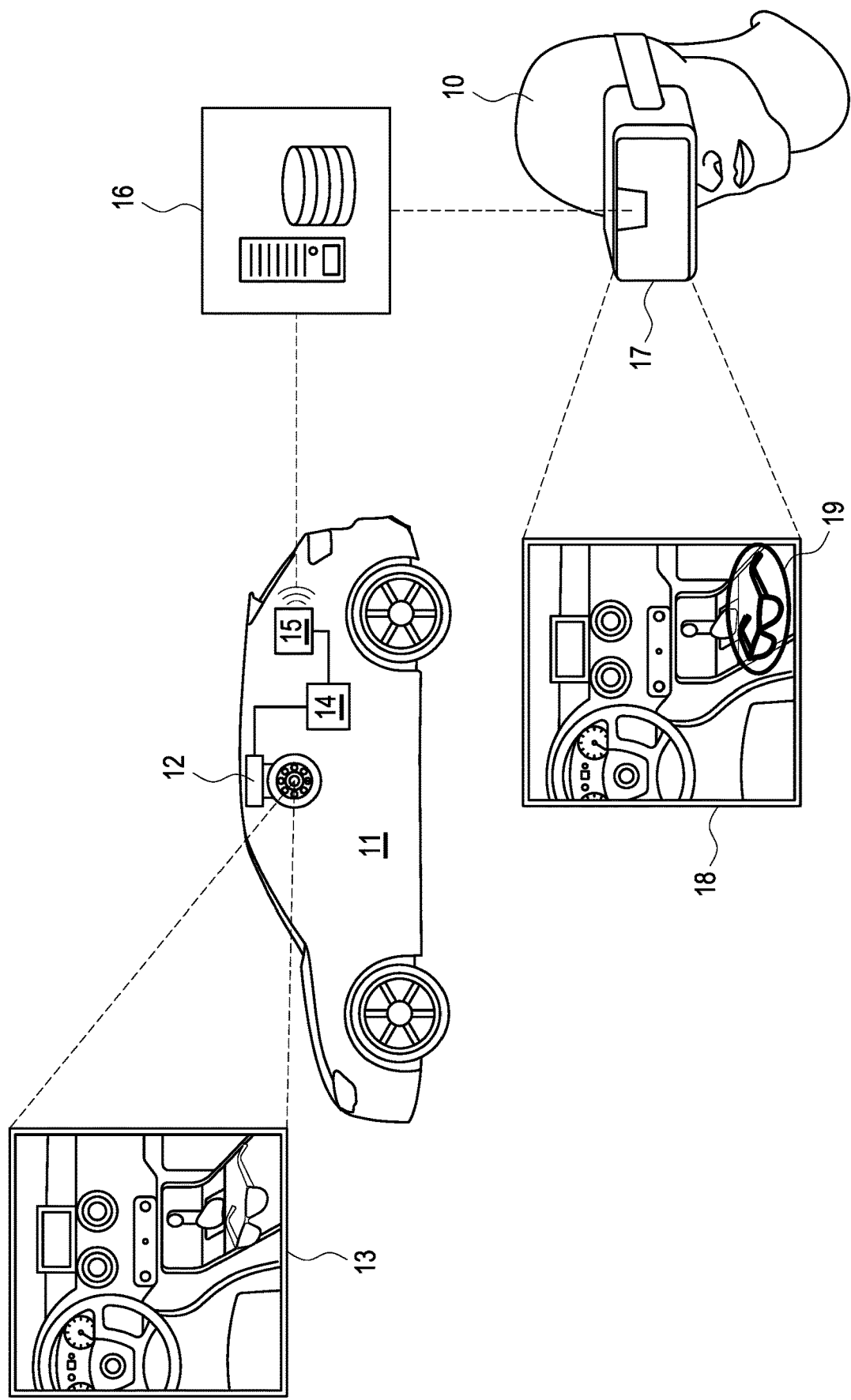

EXTERNAL DEPICTION OF PHOTOGRAPHS OF A VEHICLE IN INTERIOR IN VR GOGGLES

CROSS REFERENCE TO RELATED APPLICATIONS

This application is the U.S. national stage of International Application No. PCT/EP2018/063070, filed May 18, 2018 and claims the benefit thereof. The International Application claims the benefit of German Application No. 10 2017 208 806.0 filed on May 24, 2017, both applications are incorporated by reference herein in their entirety.

BACKGROUND

Described below are a method and a system for presenting image recordings of a vehicle interior in VR goggles.

Augmented reality apparatuses superimpose an item of additional information generated in a computer-based manner on a perceptible and/or recorded environment. In the region of the visual presentation, the additional information is displayed in the environmental image and/or added in the correct position. This can be carried out, for example, by data goggles, in the case of which a user still has his environment in the field of view. In contrast, in virtual reality, a user is decoupled from his current environment. For this purpose, a visual apparatus can be, for example, VR goggles (virtual reality: VR) which allow the user to perceive real or artificially generated images which need not come from his actual physical environment. The image information presented in a visual output unit can then be influenced by methods for detecting motion, for example of the head and/or the eyes.

The document DE 10 2013 016 245 A1 discloses a method and an apparatus for recognizing and outputting real, invisible objects in an environment. A respective marking is situated on objects which cannot be seen by the human eye, which marking can be detected by a camera on the basis of reflected light in the non-visible wavelength range and makes it possible to identify the respective object. For the object which has been identified, a processing unit generates an item of additional information which is displayed in the output image, possibly presented in data goggles.

The document DE 10 2013 019 563 A1 discloses a method for providing a smart device, for example data goggles, with information relating to an environment. A recognition system installed in the vehicle registers a presence of the smart device and provides its user with information relating to the environment. In this case, the environment is in the vicinity of the user of the smart device and may include a vehicle interior.

The document DE 10 2014 013 961 A1 discloses virtual reality goggles, in the case of which an additionally installed fan is intended to convey a driving experience which is as close to reality as possible to the user of the goggles if the user is exposed to an air flow, for example an airstream, in a virtual environment. In this case, the virtual reality goggles are used substantially to present the environment of a driver in a virtual vehicle, that is to say, in particular, also of a virtual vehicle interior.

The first two documents mentioned have the feature in common that the user must be in the vehicle or at least in the vicinity in order to obtain information relating to the interior of the vehicle. In the document mentioned last above, only a virtual vehicle interior, rather than a current real vehicle interior, is shown.

SUMMARY

Against this background, described below is a method which makes it possible to externally present the vehicle interior within a virtual reality. Also described is a corresponding system for carrying out such a method.

In the method for presenting at least one image of a vehicle interior, at least one image of the vehicle interior is recorded by at least one camera present in the vehicle, image data relating to the at least one image which are identified as vehicle-related are transmitted to an external server, a user authorized with respect to the external server for the image data identified as vehicle-related is granted access to the image data, and the image data are displayed to the user as an image by VR goggles. A plurality of cameras are advantageously arranged in the vehicle, in particular in the vehicle interior, and are advantageously positioned in such a manner that a 360° panoramic view of the vehicle interior is possibly enabled. In particular, it is advantageous if sufficient cameras are present in the vehicle in order to be able to capture both the seat area and the foot area.

In one embodiment of the method, the at least one image of the vehicle interior is recorded by at least one camera installed in an invisible manner in the vehicle. It is conceivable for the at least one camera to be integrated in a component of the vehicle interior equipment, possibly in an inconspicuous or invisible manner, that is to say in a concealed manner.

In order to capture as much of the environment as possible, it is advantageous to use a fisheye lens or any possible implementation of a wide-angle lens as the lens of the at least one camera. Optical distortions caused thereby can be removed or corrected by numerical methods for subsequent viewing of the recorded image. For this purpose, it is necessary to provide a computing unit which is either arranged in the vehicle and is communicatively connected to the external server or alternatively is integrated in the latter.

A merged image of the vehicle interior is calculated from at least two images recorded by at least two cameras present at two different positions. In this case, the merged image can be calculated by a computing unit present in the vehicle. In one configuration, this may be the same computing unit which has already been mentioned above.

It is advantageous to compress the images or image data which are obtained from the vehicle interior and transmitted to an external server by a communication unit present in the vehicle. Known numerical image data compression methods, which are carried out on a computing unit likewise present in the vehicle, can be used for this purpose. The received image data identified as vehicle-related can be decompressed again on the external server for further processing. The above-mentioned computing units arranged in the vehicle can be implemented by a computing unit which is designed to carry out the computing operations mentioned above.

In one embodiment of the method, numerical methods for recognizing at least one object are applied to the image data stored on the external server. In this case, known pattern recognition and/or edge detection methods are used to identify objects in the vehicle interior. This can also be assisted by an image comparison with a recording of an untouched, that is to say brand-new, vehicle interior.

In an extension of this embodiment of the method, the at least one object to be recognized is specified in a list, for example a wallet, keyring, smart device, sunglasses, handbag and gloves. This list can be configured, in particular expanded, in any desired manner, possibly also by the user. It is conceivable to provide geometric descriptions and/or object-specific parameters for the respective objects in such a list in the system in order to simplify and/or accelerate the identification process.

In a continued extension of this embodiment of the method, a recognized object, whether from the above-mentioned list or because it stands out from the untouched (that is to say brand-new) interior of the vehicle, for example, is marked, or highlighted in color, in the image presented in the VR goggles.

It is conceivable for the above method to be repeated in a predetermined interval of time, for example every 10, 30 or 60 minutes, or to be initiated in response to an external request. A user who is not in or at the vehicle can therefore search for objects possibly remaining in the vehicle interior in an interior view of his vehicle provided by an external server by VR goggles. In the case of VR goggles equipped with motion detection, it is possible to virtually look around the vehicle interior in a manner corresponding to a real search in situ. This means that the user with the VR goggles on is able to virtually view the vehicle interior and search for objects by rotating his head.

A system for presenting images of a vehicle interior in VR goggles has at least one camera installed in a vehicle interior, a communication device present in the vehicle, an external server which is communicatively connected to the communication device of the vehicle, and VR goggles which are communicatively connected to the external server, wherein the system is designed to carry out a method described above.

Within the scope of the present disclosure, a communicative connection should be understood as meaning a communication which can be used to transmit or interchange data between the corresponding connection participants, for example here between an external server and a vehicle or between VR goggles and an external server.

Further advantages and configurations emerge from the description and the accompanying drawing.

It goes without saying that the features mentioned above and the features yet to be explained below can be used not only in the respectively stated combination but also in other combinations or alone, without departing from the scope of the present invention.

BRIEF DESCRIPTION OF THE DRAWINGS

These and other aspects and advantages will become more apparent and more readily appreciated from the following description of the exemplary embodiments, taken in conjunction with the accompanying drawing which is a schematic illustration of the concept of one embodiment.

DETAILED DESCRIPTION OF THE PREFERRED EMBODIMENT

The drawing is a schematic illustration of the concept of one embodiment of the method in which a camera 12 which is possibly installed in an invisible manner is present in the vehicle interior of a vehicle 11, which camera creates, for example, an image 13 of a front, central dashboard region of the vehicle 11 and transmits the image 13 or the associated image data to a computing unit 14. If the one camera 12 is movable or if a plurality of cameras with different viewing angles are installed in the vehicle 11, images can be created until the vehicle interior has been captured completely. A merged image can be compiled from these images by the computing unit 14. These associated image data can be compressed by numerical methods, for example likewise carried out on the computing unit 14. The data, identified as vehicle-related, are also transmitted by a communication device 15 of the vehicle 11 to an external server 16 which acts as the backend and has a mass memory. In this case, the transmission is effected, for example, via a wireless network. If not previously carried out in the vehicle, the image data 18 can also be merged on the external server 16 to form a complete interior view of the vehicle 11 if sufficient images or image views are available for this purpose. Furthermore, the image data 18 can be processed on the external server 16 by numerical methods from the field of so-called image processing. So-called object recognition—the detection of objects in images—can also be used for this purpose, as a result of which objects, for example sunglasses, can be searched for in the system and can be used for a highlighted representation 19 in the image data 18. Finally, a user 10 can view the image data 18 by VR goggles 17, wherein the VR goggles 17 receive the image data 18 from the external server 16. For this purpose, the user 10 need not be in the vicinity of the vehicle 11, that is to say can check whether he has forgotten a possibly missed object, for example his sunglasses, in the vehicle 11, for example from home. This is possibly facilitated by the highlighted representation 19.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for presenting at least one image of an interior of a vehicle to a user authorized to view, comprising:
   recording at least one image of the interior of the vehicle by at least one camera present in the vehicle;
   identifying image data of the at least one image depicting non-human objects in the interior of the vehicle as vehicle-related;
   transmitting the image data, after the identifying, to an external server;
   applying numerical methods for recognizing at least one object to the image data, by the external server;
   granting access by the user authorized with respect to the external server to the image data; and
   displaying the at least one object, recognized by the external server, to the user by VR goggles, using the image data.

2. The method as claimed in claim 1, wherein the at least one image of the interior of the vehicle is recorded by the at least one camera installed in a location in the vehicle not visible to the user.

3. The method as claimed in claim 2, wherein at least one of the at least one camera has a fisheye lens.

4. The method as claimed in claim 3,
   wherein said recording includes at least two images recorded by respective cameras, among the at least one camera, at least at two positions inside the vehicle, and
   wherein the method further comprises generating a merged image of the interior of the vehicle from the at least two images.

5. The method as claimed in claim 4, wherein the merged image is created by a computing unit present in the vehicle.

6. The method as claimed in claim 5, further comprising compressing the image data obtained from the interior of the vehicle prior to transmission to the external server in compressed form.

7. The method as claimed in claim 6, wherein the at least one object to be recognized is selected from the list consisting of: a wallet, keyring, smart device, sunglasses, handbag, and gloves.

8. The method as claimed in claim 7, further comprising highlighting a recognized object in color in an image presented by the VR goggles.

9. The method as claimed in claim 1, wherein at least one of the at least one camera has a fisheye lens.

10. The method as claimed in claim 1,
wherein said recording includes at least two images recorded by respective cameras, among the at least one camera, at least at two positions inside the vehicle, and
wherein the method further comprises generating a merged image of the interior of the vehicle from the at least two images.

11. The method as claimed in claim 10, wherein the merged image is created by a computing unit present in the vehicle.

12. The method as claimed in claim 1, further comprising compressing the image data obtained from the interior of the vehicle prior to transmission to the external server in compressed form.

13. The method as claimed in claim 1, wherein the at least one object to be recognized is selected from the list consisting of: a wallet, keyring, smart device, sunglasses, handbag, and gloves.

14. The method as claimed in claim 13, further comprising highlighting a recognized object in color in an image presented by the VR goggles.

15. A system for presenting at least one image of an interior of a vehicle to a user authorized to view, comprising:
at least one camera, installed in the interior of the vehicle, configured to record at least one image of the interior of the vehicle;
a communication device in the vehicle configured to identify image data of the at least one image depicting non-human objects in the interior of the vehicle as vehicle-related and then transmit the image data;
an external server, connected to the communication device of the vehicle, configured to receive the image data, apply numerical methods for recognizing at least one object in image data, and grant access by the user authorized with respect to the external server to the image data; and
VR goggles, connected to the external server, configured to display to the user at least one object, recognized by the external server in the image data.

16. The system as claimed in claim 15, wherein the at least one camera is not visible to the user.

17. The system as claimed in claim 15, wherein at least one of the at least one camera has a fisheye lens.

18. The system as claimed in claim 15,
wherein the at least one camera includes at least two cameras recording at least two images, and
wherein the system further comprises a computing unit in the vehicle configured to generate a merged image of the interior of the vehicle by merging the at least two images.

19. The system as claimed in claim 15, further comprising a computing unit configured to compress the image data obtained from the interior of the vehicle prior to transmission to the external server in compressed form.

20. The system as claimed in claim 15, wherein the VR goggles are configured to highlight a recognized object in color in an image displayed to the user.

\* \* \* \* \*

UNITED STATES PATENT AND TRADEMARK OFFICE
CERTIFICATE OF CORRECTION

PATENT NO. : 11,356,641 B2
APPLICATION NO. : 16/616141
DATED : June 7, 2022
INVENTOR(S) : Tobias Müller It is certified that error appears in the above-identified patent and that said Letters Patent is hereby corrected as shown below:

On the Title Page

Column 1, Line 2, delete "VEHICLE IN" and insert --VEHICLE--.

In the Specification

Column 1, Line 2, delete "VEHICLE IN" and insert --VEHICLE--.

Signed and Sealed this
Thirtieth Day of August, 2022

*Katherine Kelly Vidal*
Katherine Kelly Vidal
*Director of the United States Patent and Trademark Office*